US012752453B2

(12) United States Patent
Kobel

(10) Patent No.: US 12,752,453 B2
(45) Date of Patent: Oct. 6, 2026

(54) APPARATUS AND METHOD FOR PRODUCING A LOCKING RING ON A CLOSURE CAP FOR A CONTAINER

(71) Applicant: PackSys Global AG, Burgdorf (CH)

(72) Inventor: Ueli Kobel, Affoltern BE (CH)

(73) Assignee: PackSys Global AG, Burgdorf (CH)

( * ) Notice: Subject to any disclaimer, the term of this patent is extended or adjusted under 35 U.S.C. 154(b) by 90 days.

(21) Appl. No.: 18/370,434

(22) Filed: Sep. 20, 2023

(65) Prior Publication Data

US 2025/0091242 A1 Mar. 20, 2025

(51) Int. Cl.
*B26F 1/18* (2006.01)

(52) U.S. Cl.
CPC ............ *B26F 1/18* (2013.01); *B26F 2210/04* (2013.01)

(58) Field of Classification Search
CPC ............................... B26F 2210/04; B26F 1/18
See application file for complete search history.

(56) References Cited

U.S. PATENT DOCUMENTS

| | | | | |
|---|---|---|---|---|
| 6,826,994 | B1 * | 12/2004 | Liao | B29C 59/007 425/291 |
| 2016/0288961 | A1 | 10/2016 | Maguire | |
| 2022/0379515 | A1 * | 12/2022 | Friedli | B26F 1/18 |
| 2023/0028211 | A1 * | 1/2023 | Penazzi | B26D 3/164 |

FOREIGN PATENT DOCUMENTS

| | | | |
|---|---|---|---|
| EP | 4122659 | B1 | 1/2024 |
| EP | 4685072 | A2 | 1/2026 |
| WO | 2020247319 | A1 | 12/2020 |
| WO | 2021063776 | A1 | 4/2021 |

OTHER PUBLICATIONS

International Search Report including Written Opinion for Application No. PCT/EP2024/074843 mailed Dec. 3, 2024. 14 pgs.

* cited by examiner

*Primary Examiner* — Liang Dong
(74) *Attorney, Agent, or Firm* — Lerner David LLP

(57) ABSTRACT

An apparatus for producing a locking ring on a closure cap for a container is disclosed. The apparatus includes a stationary fixture for a cutting knife having a cutting blade accommodated by the fixture and extending along a cutting section; and a transport installation for transporting a support mandrel along the cutting section, wherein the support mandrel is adapted for supporting a shell of a closure cap blank in such a manner that the shell during a cutting procedure is rolled on the cutting blade. The support mandrel has a rotatable mounting by way of which the support mandrel is mounted so as to be rotatable about a rotation axis oriented perpendicularly to the cutting section. The fixture is adapted to accommodate at least one cutting knife in a first and second configuration.

17 Claims, 7 Drawing Sheets

APPARATUS AND METHOD FOR PRODUCING A LOCKING RING ON A CLOSURE CAP FOR A CONTAINER

BACKGROUND OF THE INVENTION

Field of the Invention

The present disclosure relates to an apparatus for producing a locking ring on a closure cap for a container, in particular for a beverage bottle. The disclosure furthermore relates to an assembly which for producing a closure cap for a container comprises the apparatus, as well as to a method for producing a closure cap for a container.

Description of Related Art

In order to ensure for users when buying a container such as, for example, a beverage bottle, that the container is still in the original state and has not been previously deliberately or inadvertently opened, closure caps for containers of this type are in most instances provided with a locking ring. This locking ring is connected to a main part of the closure cap that fulfills the closure function by way of a predetermined breaking point such that the predetermined breaking point is inevitably damaged when the container is opened and the initial opening of the container can be reliably identified from the outside. In order to guarantee this securing function, the locking ring when extracting or unscrewing the cap part is held on the container at least until the predetermined breaking points break. To this end, the container in an extraction direction on a neck on which the closure cap sits usually has an undercut, for example in the shape of a bead, the locking ring engaging behind the latter from below, i.e. counter to an opening direction. As a result thereof, when the closure cap is being removed, the locking ring resists extraction on the bead of the container such that the predetermined breaking point is torn open. For this purpose, an encircling, occasionally interrupted, beading which is folded inward is typically configured on the locking ring, the locking ring engaging on the bead on the container from the rear by way of said beading. It is also known for a thickened portion instead of a beading to be provided on the locking ring.

In order to prevent the main part being able to be separated upon removal from the container, the predetermined breaking point can be configured in such a manner that a connection between the main part and the locking ring remains upon removal. In this case, upon removal of the main part, the opening of the container should be freely accessible, which is readily possible for example by designing the predetermined breaking point and the locking ring appropriately. Thus, in the context of an intended use, the main part is captively secured to the container via the locking ring. This is advantageous with a view to ecological sustainability, in particular with a view to reducing plastic waste which is disposed of in an uncontrolled manner.

A closure cap of this type is described, for example, in US 2016/0288961 A1 (M. J. Maguire). Here, a plurality of cuts are introduced into a closure cap blank, said cuts forming a predetermined breaking point in such a manner that the main part of the closure cap upon breaking the predetermined breaking point remains connected to the locking ring by way of a plurality of bridges.

Locking rings of this type are typically generated by cutting the predetermined breaking point into a closure cap blank. However, methods of this type are mostly imprecise, for example because the folded beading of the locking ring forms an imprecise cutting support surface. There is more over the risk, for example, that the beading of the locking ring, or other parts, are damaged during cutting in the case of deviations in the closure cap blank, this potentially compromising the reliability of the closure cap thus produced. Other methods such as, for example, laser cutting, are complex and cost intensive.

WO 2021/063776 A1 (Packsys Global AG) proposes an apparatus for producing a locking ring on a closure cap for a container, where in a supporting portion of a mandrel supporting the closure cap blank, which is located opposite the cutting blade during the cutting operation, a groove geometry is formed, which corresponds at least to the slot geometry to be created. The apparatus further comprises a synchronization device by means of which a forward feed of the transport device along the cutting path is able to be synchronized with a rotational movement of the supporting mandrel about the axis of rotation. This apparatus requires dedicated mandrels for each cutting geometry, the groove structure of the respective mandrel reproducing the respective cutting geometry.

WO 2020/247319 A1 (Closure Systems International Inc.) proposes a method of forming a cut in a polymeric component includes using a mandrel including a rigid portion and a conformal support ring. The conformal support ring includes a material softer than the material forming the blade. The blank is located between the mandrel and at least one cutting blade. The polymeric component is cut via the at least one blade. The at least one blade extends into the conformal support ring after the at least one blade has penetrated through the polymeric component. This allows for improving the support of the blank without having to provide dedicated mandrels. However, the continuous interaction of the cutting blade with the conformal support ring leads to increased wear of the blade, and chips generated by the interaction between the support ring and the blade may have a negative impact on the cutting process.

There is thus a requirement, in terms of a simple and reliable possibility, for producing a closure cap having a predetermined breaking point, said closure cap overcoming the disadvantages of the prior art and in particular permitting complex slot geometries of the predetermined breaking point to be produced in a reliable and simple manner.

BRIEF SUMMARY OF THE INVENTION

It is an object of the invention to achieve an apparatus as well as a method associated with the technical field mentioned at the outset, said apparatus and said method enabling a reliable and cost-effective production of closure caps having a locking ring.

The solution is defined by the features of claim 1. According to the invention, the apparatus comprises:

a) a stationary fixture for a cutting knife having a cutting blade, wherein the cutting blade of the knife accommodated by the fixture extends along a cutting section;

b) at least one cutting knife to be accommodated by the fixture; and c) a transport installation for transporting a support mandrel along the cutting section, wherein the support mandrel is adapted for supporting a shell of a closure cap blank, in particular for supporting directly a shell internal side, in such a manner that the shell during a cutting procedure is rolled on the cutting blade, wherein the support mandrel has a rotatable mounting by way of which said support mandrel is mounted so as to be rotatable about a rotation axis oriented perpendicularly to the cutting section.

The fixture is adapted to accommodate at least one cutting knife in a first configuration in which the cutting blade has a first radial position relative to a path of the support mandrel and in a second configuration in which the cutting blade has a second radial position relative to the path of the support mandrel, wherein a radial distance of the cutting blade from a path of the support mandrel is larger in the second position than in the first position. The support mandrel includes at least one section running around a circumferential surface of the support mandrel in an angular range, wherein the section is made of a cuttable material.

In the first configuration, the cutting blade of the at least one cutting knife engages with the cuttable material of the at least one section of the support mandrel to create a lasting groove in the cuttable material. In the second configuration, the cutting blade of the at least one cutting knife engages with the shell of the closure cap blank to generate a slot geometry in the shell of the closure cap.

The apparatus further comprises a synchronizing installation by means of which an advancing movement of the transport installation along the cutting section can be synchronized with a rotating movement of the support mandrel about the rotation axis.

In the present context, the "cutting section" describes the portion of a section of a transport path of the closure cap blank during the cutting procedure, said transport path being defined by the transport installation. The cutting section here is disposed in a transport plane which is perpendicular to the rotation axis of the support mandrel. The transport plane is typically aligned to be horizontal.

The "cutting knife" presently describes an assembly of one or a plurality of cutting blades, which are typically elongated. The cutting blades typically have a plate which supports the cutting edges of the cutting blade. The cutting edges, when viewed in a projection parallel to the rotation axis of the support mandrel onto the transport plane, can be rectilinear or be curved, in particular concave when viewed from the plate.

The "slot geometry" describes the profile of one or a plurality of slotted portions which are to be generated on the closure cap blank or are to be present on the completed closure cap, respectively. The slot geometry has interruptions, as a result of which connecting locations remain between the main part and the locking ring. The connecting locations here form supporting bridges or holding bridges, for example, which in the sense of predetermined breaking points are provided for separation in the case of the main part being fully or partially separated from the locking ring, and/or connecting portions which in the event of a partial separation are provided to remain, i.e. the main part in the connecting portion remains connected to the locking ring once said main part has been partially separated.

The cutting blade has a cutting-edge profile that includes two, generally superimposed, profiles of the cutting edge in their entirety: a longitudinal profile which describes the cutting edge profile along the cutting section, as well as a height profile which describes the cutting edge profile in a direction perpendicular to the cutting section and parallel to the rotation axis of the support mandrel. In order to generate the interruptions between individual slotted portions of the slot geometry, the longitudinal profile of the cutting blade can be correspondingly interrupted. For example, if a serrated profile of the slot geometry is to be generated in the shell of the closure cap, the cutting blade has a corresponding serrated height profile. Should it be necessary for only weakened regions to be generated in addition to the slot geometry in the shell of the closure cap blank, i.e. regions in which the shell of the closure cap is scored but not cut through, there can also be a depth profile which describes the cutting-edge profile in a direction perpendicular to the cutting section and perpendicular to the rotation axis of the support mandrel.

The "transport installation" describes an apparatus which is configured in such a manner that the closure cap blank in the cutting edge can be transported past the cutting knife in such a manner that a cutting procedure, i.e. scoring, of the shell of the closure cap blank by the stationary cutting knife takes place. The support mandrel of the transport installation, by way of the support portion, typically engages in an interior of the closure cap blank in such a manner that the shell of the closure cap blank in a momentary cutting region is guided against the cutting blade from the interior by the support portion. The support region of the support mandrel in a momentary cutting region here supports the shell in particular by bearing directly on a shell internal side. "Bearing directly" here describes a direct contact between the support region of the support mandrel and the internal face of the shell portion at least in the momentary cutting region, i.e. in the shell portion in which a cutting procedure is currently taking place.

The transportation of the closure cap blank through the transport installation comprises a translatory movement along the transport path (advancing movement) as well as a rotating movement about a rotation axis which is parallel to (or coaxial with) the rotation axis of the support mandrel and is superimposed on this advancing movement. The rotating movement of the closure cap blank is supported or achieved by rotating the support mandrel about the rotation axis defined by the rotatable mounting. In this way, the shell of the closure cap blank can be rolled on the cutting blades while being transported along the cutting section.

Using the inventive apparatus, an inventive method for producing a closure cap for a container may be carried out, said method comprising the following steps:

a) providing a cutting knife with a cutting blade, a cutting-edge profile of the cutting blade corresponding to a slot geometry to be generated in a shell of a closure cap blank;
b) arranging the cutting knife in a first configuration in which the cutting blade has a first radial position relative to a path of a support mandrel, the support mandrel being mounted so as to be rotatable about a rotation axis oriented perpendicularly to a cutting section;
c) preconditioning the support mandrel by rolling the support mandrel along the cutting blade of the cutting knife in the first configuration;
d) arranging the cutting knife in a second configuration in which the cutting blade has a second radial position relative to the path of the support mandrel, wherein a radial distance of the cutting blade from a path of the support mandrel is larger in the second position than in the first position;
e) providing a closure cap blank;
f) producing a locking ring by generating the slot geometry in the shell of the closure cap blank in a cutting procedure by rolling the shell, supported by the preconditioned support mandrel, along the cutting blade of the stationary cutting knife arranged in the second configuration;

wherein a rotating movement of the support mandrel takes places so as to be synchronized with an advancing movement of the shell the along the cutting section.

When preconditioning, no closure cap (blank) is accommodated on the support mandrel. Preconditioning generates a lasting groove (or a plurality of lasting grooves) which during the cutting procedure lies opposite the cutting blade and by way of which the support mandrel in a momentary cutting region bears, in particular directly, on a shell internal face of the shell.

In the actual cutting step, the support mandrel lies opposite the cutting blade, which is brought to engage with the groove in the respective section of the support mandrel. The groove is moved past the cutting blade so as to be congruent with the cutting-edge profile of the cutting blade. Steps e) and f) will be repeated in a cycle, i.e. a large number of locking rings may be produced using the same support mandrel once the latter has been preconditioned.

After preconditioning, the groove geometry obtained in the section made from the cuttable material, forming at least part of a support region of the support mandrel corresponds to the slot geometry to be generated, i.e. the groove geometry is configured in such a manner that the latter in the course of a complete cutting procedure encompasses the profile of the entire cutting blade. It is understood that the same grooved portions in the course of more than one revolution of the support mandrel during the cutting procedure may encompass different portions of the profile of the cutting blade.

During the cutting procedure, in particular in the momentary cutting region, the support portion preferably bears directly on an internal face of the shell of the closure cap blank. A largest radial external diameter of the support portion here is preferably smaller than a smallest radial internal diameter of the closure cap blank in order for the latter to be able to be readily placed on the support mandrel in the direction of the rotation axis, i.e. also along a longitudinal axis of said support mandrel, and be readily removed again from said support mandrel. In this case, the support portion, by virtue of the smaller diameter, by way of the shell face of the former rolls on the internal face of the shell of the closure cap blank during the cutting procedure. In this case, the support mandrel performs more than one revolution about the rotation axis thereof in order to complete an entire revolution of the closure cap blank. In principle, it is also conceivable for a largest radial external diameter of the support portion to largely correspond to a smallest radial internal diameter of the closure cap blank such that the closure cap blank can sit firmly on the support portion of the support mandrel. In this case, a complete revolution of the support mandrel corresponds to a complete revolution of the closure cap blank. The shell face of the support portion can be adapted to a profile of the internal face of the shell of the closure cap blank. In general, the shell face of the support portion, with the exception of a groove geometry, which is potentially configured so as not to be a rotationally symmetrical on said support portion, is configured to be substantially rotationally symmetrical in terms of the rotation axis of the support mandrel.

According to the invention, the apparatus comprises a synchronizing installation by means of which a movement of the transport installation along the cutting section can be synchronized with a rotating movement of the support mandrel about the rotation axis. In this way, the advancing movement of the transport installation as well as the rotating movement of the support mandrel, in particular in the region of the cutting section, can be mutually coupled in such a manner that the groove in the cuttable section of the support mandrel in the momentary cutting region is always moved past the cutting blade so as to be congruent with the cutting edge profile of the cutting blade; i.e. at any given time a portion of the groove geometry is disposed so as to be opposite the cutting edge of the cutting blade in the momentary cutting region. The closure cap blank here is entrained, inter alia, by way of the support region of the support mandrel and is likewise rolled in a synchronized manner on the cutting blades; i.e. said closure cap blank is imparted a corresponding advancing movement having a correspondingly superimposed, synchronized rotating movement.

The synchronizing installation can comprise a mechanical or an electronic coupling, for example. In mechanical terms, a synchronized coupling of the advancing movement of the transport installation to the rotating movement of the support mandrel can be reached by way of a gearbox, for example. In electronic terms, a correspondingly synchronized control of separate drives for the advancing movement of the transport installation and for the rotating movement of the support mandrel can be provided. For example, an open-loop control or closed-loop control which by way of sensors obtains data pertaining to the current position and/or rotary position and correspondingly controls the respective drives by way of an open loop or a closed loop, respectively, is conceivable here.

The groove produced in the support region using the actual cutting knife has the advantage that the shell of the closure cap blank during the cutting procedure in the momentary cutting region is imparted a largely complete support which needs to be interrupted only in the region of the slot geometry to be generated, i.e. on the circumference of the groove geometry. At the same time, the cutting blade, or the cutting edge thereof, respectively, can penetrate the shell and engage, in particular in a non-contacting manner, in the groove geometry, i.e. be introduced into the groove in a direction perpendicular to the rotation axis of the support mandrel. A reliable and well-defined cut for generating the slot geometry is achieved in this way. In particular, there is no risk of, for example, the cutting knife, the transport installation, in particular the support mandrel, or regions, or parts, respectively, of the closure cap blank that are not provided for cutting being damaged despite a fully penetrating cut.

By virtue of the shell being, in particular directly, supported in the cutting region, the slot geometry can be generated in a particularly reliable manner with a high cutting precision. As opposed to solutions in the prior art, where the folded portion of the shell for forming the locking ring also had to assume a supporting function when generating the slot geometry, the closure cap blank can in particular also be machined without a folded shell.

The cutting blade is preferably disposed relative to the support mandrel in such a manner that the cutting blade, in particular a cutting edge of the cutting blade, during the cutting procedure of the closure cap engages in the groove of the preconditioned support mandrel. It can be ensured in this way that the shell of the closure cap blank is completely cut through without the cutting knife, the transport installation, in particular the support mandrel, or regions or parts, respectively, of the closure cap blank that are not provided for cutting, being damaged. Alternatively however, the cutting blade during the cutting procedure can also remain radially outside the groove, wherein it is ensured by the groove that no damage takes place in the event of minor deviations in the radial direction.

Compared to the known solution with a conformal support ring the lifetime of the cutting blade is increased because there is no interaction between the cutting blade and the support that could lead to (additional) wear of the cutting blade, in particular of the sensitive cutting edge. No chips are produced in the actual cutting steps. Due to a clearly defined groove geometry and depth secure operation is ensured and the production of dust during manufacture is avoided.

Compared to the known solution with a prefabricated groove geometry in the mandrel, the production of a mandrel matching a certain cutting geometry is greatly simplified. The elements constituting the cuttable material section(s) are wear parts that may be easily replaced, and it is not necessary to provide specific parts for specific cutting geometries.

In a first preferred embodiment, the fixture is adapted to accommodate the cutting knife in different radial positions relative to the path of the support mandrel. In particular, the fixture provides at least two attachment positions defining the knife position in the first and in the second configuration, respectively. The attachment positions may be defined by elements such as stops, pins, grooves or similar.

In a second preferred embodiment, the fixture comprises an adjustment mechanism for adjusting a radial position of the fixture relative to the path of the support mandrel, i.e. when going from the first to the second configuration (or vice versa) the knife is not removed from the fixture and reattached thereto but the adjustment mechanism is actuated to move the knife from a first position relative to a stationary portion of the fixture to a second position relative to the stationary portion.

In further embodiments of the invention, for the preconditioning (in the first configuration) and for the actual production run (in the second configuration) different knifes are used. These knifes are removably attached to the fixture. They relate to the same slot geometry but define different radial distances to the path of the support mandrel and may have a different cutting-edge geometry as this allows for specifically optimizing the blades for the working of the cuttable material and the actual cutting step, respectively.

Preferably, a radial distance of the cutting blade in the second configuration from the cutting blade in the first configuration is 0.1-0.5 mm. In particular, in the first configuration the blade penetrates into the cuttable material to a depth of 0.1-0.4 mm, in particular 0.2-0.3 mm. In the second configuration, the blade penetrates into the groove obtained in the preconditioning to a depth that is about 0.1 to 0.5 of the depth of the groove, e.g. 0.025-0.075 mm.

Advantageously, a cross-sectional geometry of a cutting edge of the cutting blade is tapered. This ensures that the width of the groove produced in the preconditioning is larger than the width of the blade portion entering into the groove in the subsequent cutting steps, and therefore collisions between the blade and the boundary surfaces of the groove are reliably avoided even if tolerances in the relative movement of the support mandrel in relation to the stationary cutting knife are taken into account.

A cuttable material is a material that, in general, is softer than the structural material constituting the main part of the mandrel. It allows for the production of lasting grooves without excessively wear the cutting blade used therefor.

Preferably, the cuttable material is a polymer. In particular, the cuttable material is polyether ether ketone (PEEK). It has a very good durability, is food safe and can be machined as required.

In an embodiment of the invention, the at least one section made of the cuttable material is constituted by a single ring arranged circumferentially on the support mandrel. The ring-like shape ensures that the initial rotational position prior to the preconditioning is irrelevant.

Several configurations are possible:

A) The axial width of the ring is chosen in such a way that the entire cutting geometry may be accommodated. This ensures maximum support of the shell of the closure cap blank independent from the actual cutting geometry.

B) Many cutting geometries feature long sections featuring horizontal slits, wherein horizontal slits may be arranged in different axial positions in different sections. Therefore, in a further configuration, recesses are arranged in the shell of the mandrel, adjacent to the ring made from the cuttable material. In the horizontal sections, the cutting blade is accommodated by the recess(es), whereas only the grooves for all the non-horizontal sections are produced in the pre-conditioning.

In one preferred embodiment, the slot geometry to be generated comprises portions which in relation to the rotation axis of the support mandrel extend at an angle of less than 90°. In other words, this means that the slot geometry can comprise portions which are inclined in relation to the transport plane or, if desired, are perpendicular to the latter, that is to say are disposed so as to be parallel to the rotation axis of the support mandrel. Accordingly, the cutting edge of the cutting blade can have a height profile which comprises portions which can ascend or descend in a direction parallel to the rotation axis. In this way, complex slot geometries which enable a diverse application of the apparatus according to the invention can be generated. Angular features of this type of the slot geometry have the advantage, in particular at the ends of slotted portions, that tearing or ripping of the slot, respectively, into further regions of the closure cap can be prevented or impeded, respectively. Moreover, as a result of angular features of this type, the slot geometry can be guided in such a manner, for example, that a convexity or a widening, respectively, for improved support can be achieved in regions with greater stress, for example in a wide interruption in the slot geometry that is provided as an articulated connecting point.

However, it is also conceivable that the slot geometry is of a simple configuration and comprises only portions which are disposed at an angle of 90° in relation to the rotation axis, i.e. rectilinear slotted portions parallel to the transport plane.

The cutting knife can be configured so as to be modular and comprise one or a plurality of replaceable cutting elements which complement one another so as to form the cutting blade. For example, it can be achieved in this way that portions of the cutting knife which are subject to more wear, for example are blunted more rapidly, can be separately replaced. Likewise, a complex cutting-edge profile of the cutting knife can be simply constructed in a modular manner by assembling a plurality of rectilinear but relatively inclined portions of different cutting elements, for example.

In particular, portions having an angle of 90° in relation to the rotation axis of the support mandrel and portions having an angle of less than 90° can be provided by different cutting elements. A cutting element can preferably also comprise all of the portions of the cutting knife that are inclined by an angle of less than 90°, while the remaining portions are provided by one or a plurality of further cutting elements. In this way, the inclined portions which typically wear more rapidly can be conjointly replaced. In the case of a plurality of cutting blades of the cutting knife, the latter can likewise be provided by different cutting elements or comprise in each case a plurality of replaceable cutting elements. However, it is also conceivable that the cutting blade(s) of the cutting knife is/are integrally configured, for example configured as integral stamped-and-bent parts on which the cutting edges are configured.

In one preferred embodiment, the cutting knife can have a plurality of cutting blades which in the direction of the rotation axis of the support mandrel are disposed on top of one another, in particular so as to at least partially overlap. A multi-layer slot geometry can thus be simply generated in the course of only one complete revolution of the closure cap blank, for example. In this context, multi-layer describes a slot geometry which in the direction of the rotation axis of the support mandrel has slotted portions disposed at different heights.

In an embodiment which could be likewise preferable, depending on the requirement, the slot geometry is defined by at least 1.25 revolutions of the support mandrel, and the groove geometry of the support mandrel corresponds to a superimposition of the slot geometry during the at least 1.25 revolutions. The support region of the support mandrel during the cutting procedure here rolls on a shell internal side of the shell in such a manner that the closure cap blank in the course of the 1.25 revolutions of the support mandrel preferably performs exactly one full revolution. It is achieved in this way that the support portion can have an external circumference which is smaller than an internal circumference of the shell of the closure cap blank, introducing and/or extracting the support mandrel into or from, respectively, the interior of the closure cap blank thus being simplified. Moreover, generating different portions of the slot geometry in the course of more than one revolution can be advantageous in particular in a complex slot geometry which comprises intersecting slot portions, for example.

It is likewise conceivable that the closure cap blank per se carries out more than one complete revolution for carrying out a complete cutting procedure. It is understood that the cutting section in the case of a plurality of revolutions required for a complete cutting procedure typically comprises a longer portion of the transport path than in the case of a cutting procedure which requires only one revolution.

The synchronizing installation preferably comprises a synchronizing mechanism which mechanically synchronizes an axle of the rotatable mounting of the support mandrel with a movement of the transport installation along the cutting section. A mechanical synchronizing mechanism typically comprises a gearbox which couples the axle, i.e. an axle member or a shaft, of the support mandrel to the advancing movement of the transport installation. The gearbox here can comprise, for example, components that interact in a form-fitting and/or force-fitting manner, such as gearwheels, friction rollers, annular internal toothing or traction means drives such as, for example, V-belts/timing belts or chains, etc. The gearbox is typically designed in such a manner that there is a positive coupling between the rotating movement of the axle and the advancing movement of the transport installation. The synchronizing mechanism preferably comprises a ring which is stationary in relation to the transport installation and has an internal toothing on which a gearwheel rolls at least in the region of the cutting section when the transport installation moves, said gearwheel interacting with the axle of the rotatable mounting of the support mandrel and being in particular fixedly connected to the axle.

Of course, the gearbox can also have a coupling apparatus by way of which the two movements can be decoupled when required, for example for servicing.

It is likewise conceivable that the synchronizing installation is electrically implemented, for example by correspondingly controlling separate drives for the advancing movement of the transport installation and the rotating movement of the support mandrel. To this end, the synchronizing installation preferably comprises a first electric motor for driving an axle of the rotatable mounting of the support mandrel, a second electric motor for the movement of the transport installation along the cutting section, i.e. for the advancing movement of the transport installation, and a control apparatus for synchronizing a movement of the first motor and of the second motor. For example, servomotors, stepper motors or linear motors, or combinations thereof by way of which the desired movements can be achieved can be used as electric motors here. The synchronizing installation can comprise, for example, a separately driven timing belt which synchronizes the rotating movement of the support mandrel with the advancing movement of the transport installation by way of a sprocket sitting on the axle of the support mandrel. Alternatively, each support mandrel can also have a separate drive, for example.

Depending on the requirement, the synchronizing installation preferably also comprises one or a plurality of sensors, by way of which a rotary position of the axle of the support mandrel and/or a position of the transport installation can be monitored or measured, for example. The corresponding measurements can be evaluated by the control apparatus, as a result of which a continual adjustment of the synchronization can take place. It is likewise understood that the control apparatus can be configured as a closed-loop control.

In one preferred embodiment, the transport installation is configured as a rotary table, wherein a plurality of support mandrels are preferably disposed along a circumference of the rotary table. The cutting blade of the cutting knife here preferably extends along the circumference of the rotary table. A rotation axis of the rotary table is preferably disposed so as to be parallel to the rotation axes of the support mandrels, wherein the support mandrels are moved past the cutting blade when the rotary table rotates. The rotary table can have two support structures which are disposed so as to be mutually spaced apart in a largely parallel manner and perpendicular to the rotation axis, for example, and on which the support mandrels can be mounted directly or indirectly. The axles of the support mandrels, by way of one of the end regions thereof, here can be rotatably mounted on one of the support structures, for example. However, the rotary table can also advantageously be configured in such a manner that the axles of the support mandrels are only unilaterally mounted on the rotary table. It is understood that a support or guide for the closure cap blanks that supports or guides, respectively, said closure cap blanks along the transport path can be present as part of the rotary table per se or as a separate, for example stationary, part. A support surface here is preferably disposed to be parallel to the transport plane at least in the region of the cutting section.

The invention may be used in an assembly for producing a closure cap for a container, comprising an apparatus for producing a locking ring as presently described, as well as an apparatus for generating an inward-folded portion of the shell of the closure cap. Inward folding here describes folding of the shell portion, in particular of a portion of the locking ring, in a direction which is directed toward the interior of the closure cap.

The apparatus for generating the inward-folded portion in the processing direction is preferably disposed downstream of the apparatus for producing the locking ring. The closure cap having the slot geometry generated in the apparatus according to the invention can thus be fed by the transport installation of said apparatus, for example, or by a further transport system, to the downstream apparatus for generating the folded portion. In this case, the locking ring already generated by the slot geometry is at least in portions folded inward such that the production of the closure cap can be completed with the folding. Alternatively, the apparatus for generating the inward-folded portion can in the processing direction also be disposed so as to be upstream of the apparatus for producing the locking ring. In this case, a shell portion which after the production of the slot geometry lies in the region of the locking ring can be folded inward beforehand. According to the invention, the already inward-folded portion does not compromise the cutting procedure because the support mandrel by way of its support region in the momentary cutting region also in this case bears in each case, in particular directly, on the shell internal face.

The inward-folded part of the locking ring in both cases ultimately forms a protrusion which encircles the inside of the shell and is configured as an annular and optionally interrupted beading. When placed on the container, for example on a bottleneck, the beading engages from behind a bead configured on the container and in the sense of a barb thus blocks the locking ring from being extracted. It can thus be ensured that the locking ring remains on the container when the main part of the closure cap is fully or partially separated from the locking ring, i.e. the predetermined breaking point provided by the slot geometry is broken.

Instead of being formed by an inward-folded part of the locking ring, the protrusion can also be formed by a thickened shell portion. A folding of the shell portion can be dispensed with in this case. However, the slot geometry can be generated in the same way as in the variants with a beading.

Before or after the production of the locking ring by generating a slot geometry according to step b), an inward-folded portion of the shell is in particular generated.

If the inward-folded portion is generated before the production of the locking ring, post-machining of the already cut closure cap can be dispensed with. If the inward-folded portion is generated only after the production of the locking ring, the closure cap blank is provided in the non-folded state. After the locking ring has been produced by generating the slot geometry in the apparatus according to the invention, the closure cap having the introduced slot geometry is fed to the apparatus for generating a folded portion. Proceeding from the shell of the closure cap, the locking ring produced by the generated slot geometry is folded inward in this apparatus for generating a folded portion.

A non-folded shell of the closure cap here is understood to be a shell that is configured so as to be single-layered in the radial direction, i.e. that no portions of the shell are disposed so as to overlap in a direction perpendicular to the rotation axis of the support mandrel.

In that the preconditioned support mandrel in the momentary cutting region by way of the support region according to the invention bears, in particular directly, on a shell internal face, the shell is supported by the support mandrel during the cutting procedure. The support region thus forms a well-defined cutting support surface for generating the slot geometry. The cutting blade can in particular completely penetrate the shell and, for example, engage in the groove without other parts of the closure cap or of the support mandrel being able to be damaged. The synchronization of the rotating movement with the advancing movement of the shell along the cutting section here preferably takes place in such a manner that a portion of the groove geometry is disposed opposite the cutting blade at every moment during the cutting procedure in the momentary cutting region of the cutting edge.

When carrying out the method, the cutting blade, in particular the cutting edge thereof, is preferably brought to engage with the groove in the support portion of the support mandrel during the cutting procedure.

Further advantageous embodiments and combinations of features of the invention are derived from the detailed description hereunder and the entirety of the patent claims.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure. The following embodiments are presented with reference to the accompanying figures, wherein.

In principle, identical parts are provided with the same reference signs in the figures.

DETAILED DESCRIPTION OF THE INVENTION

Figure 1A:
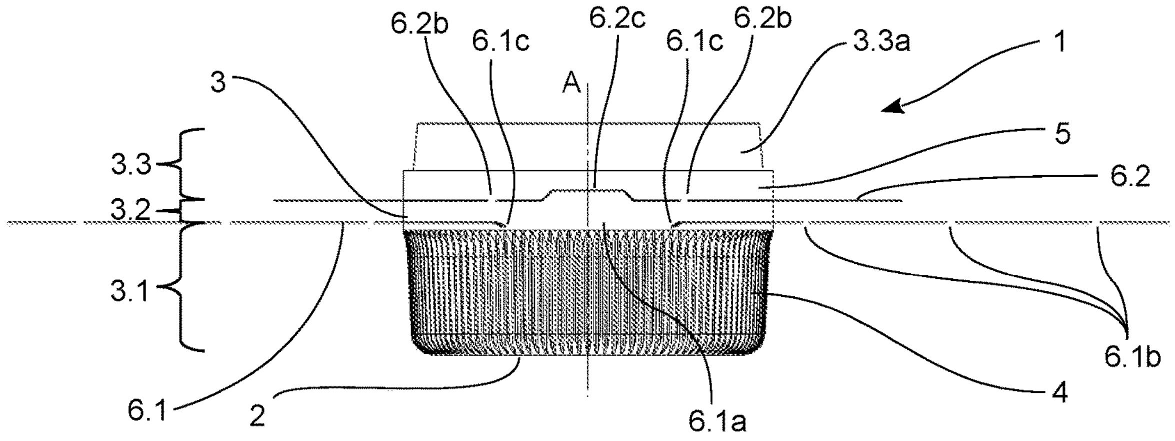
FIGS. 1*a*-1*c* depict a closure cap having a locking ring for closing a container.

The subject-matter described in the following will be clarified by means of a description of those aspects which are depicted in the drawings. It is however to be understood that the scope of protection of the invention is not limited to those aspects described in the following and depicted in the drawings; to the contrary, the scope of protection of the invention is defined by the claims. Moreover, it is to be understood that the specific conditions or parameters described and/or shown in the following are not limiting of the scope of protection of the invention, and that the terminology used herein is for the purpose of describing particular aspects by way of example only and is not intended to be limiting.

Unless otherwise defined, technical and scientific terms used herein have the same meaning as commonly understood by one of ordinary skill in the art to which this invention belongs. Further, unless otherwise required by the context, singular terms shall include pluralities and plural terms shall include the singular. The methods and techniques of the present disclosure are generally performed according to conventional methods well known in the art and as described in various general and more specific references that are cited and discussed throughout the present specification unless otherwise indicated. Further, for the sake of clarity, the use of the term "about" is herein intended to encompass a variation of +/−10% of a given value.

Non-limiting aspects of the subject-matter of the present disclosure will be described by way of example with reference to the accompanying figures, which are schematic and are not intended to be drawn to scale. For purposes of clarity, not every component is labelled in every figure, nor is every component of each aspect of the invention shown where illustration is not necessary to allow those of ordinary skill in the art to understand the invention.

The following description will be better understood by means of the following definitions.

As used in the following and in the appended claims, the singular forms "a", "an" and "the" include plural referents unless the context clearly dictates otherwise. Also, the use of "or" means "and/or" unless stated otherwise. Similarly, "comprise", "comprises", "comprising", "include", "includes" and "including" are interchangeable and not intended to be limiting. It is to be further understood that where for the description of various embodiments use is made of the term "comprising", those skilled in the art will understand that in some specific instances, an embodiment can be alternatively described using language "consisting essentially of" or "consisting of."

Figure 1B:
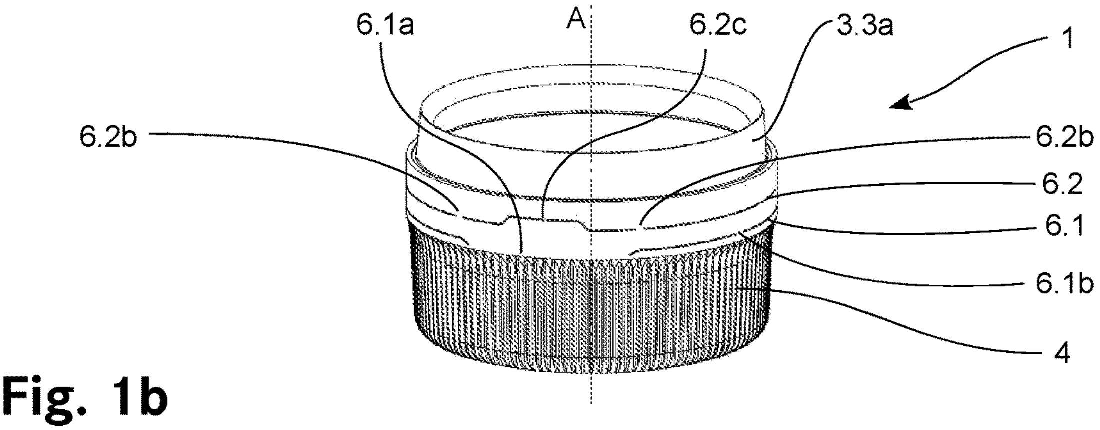
Figure 1C:
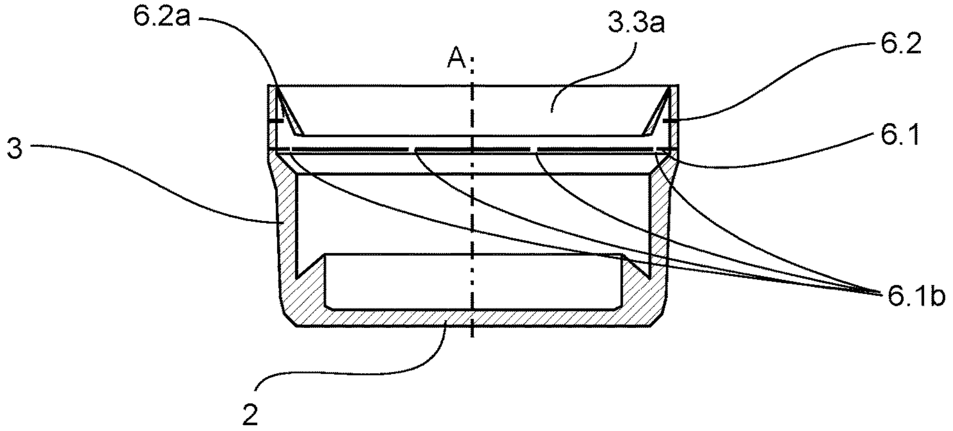

FIGS. 1*a* to 1*c* show a closure cap 1 for closing a container. FIG. 1*a* shows a lateral view, FIG. 1*b* shows an oblique view, and FIG. 1*c* shows a cross section through a primary axis A of the closure cap 1. Without limiting the generality, with a view to a simplified illustration reference hereunder is made to a bottle with a bottleneck instead of a container in general, said bottle being able to be closed by the closure cap 1. The corresponding application in containers of a different shape can be concluded directly therefrom.

The closure cap 1 comprises a circular end side 2 as well as a shell 3 which is largely in the shape of a tubular connector and extends away from the end side 2 so as to be concentric with the primary axis A of the closure cap 1. The shell 3 in the shape of a tubular connector at a longitudinal end is terminated in the direction of the primary axis A by the end side 2, the latter being disposed so as to be concentric with the shell 3. With the exception of a slot geometry 6 present in the shell 3 (see below) as well as an internal thread potentially present in the shell 3 (not illustrated), the closure cap 1 is configured so as to be substantially rotationally symmetrical in terms of the primary axis A.

The shell 3 can be subdivided into three longitudinal portions 3.1 to 3.3. The shell portion 3.1 conjointly with the end side 2 forms a main part 4 of the closure cap 1, said main part 4 closing the opening of the bottleneck. The main part 4 on the inside of the shell 3 typically has a connection means such as an internal thread or a snap-fit means (not shown) by way of which said main part can be fastened to the bottleneck by being screwed or snap-fitted to the latter. A longitudinal fluting which facilitates the manual removal of the main part 4 from the bottleneck, for example by a screwing movement, is present on the external side on the shell portion 3.1.

The shell portion 3.3 forms a locking ring 5 which remains on the bottleneck when the main part 4 is removed from the bottle. Toward an open end of the shell 3 the shell portion 3.3 has a sub-portion 3.3*a* which is provided for folding into an interior 1.1 of the closure cap 1. The sub-portion 3.3*a* is illustrated in a non-folded state of the locking ring 5 in FIGS. 1*a* and 1*b*. The cross section according to FIG. 1*c* shows the closure cap 1 of FIGS. 1*a* and 1*b* after the sub-portion 3.3*a* has been folded inward and forms an inward-protruding beading. The inward-protruding beading is provided for engaging from behind an undercut in the form of a bead or a notch configured on the bottleneck. The locking ring 5 by way of the beading can hook onto the undercut of the bottleneck and be secured against extraction.

The slot geometry 6 which presently comprises two partially encircling slots 6.1 and 6.2 which are not contiguous is configured between the main part 4 and the locking ring 5. The slots 6.1 and 6.2 are configured on the shell 3 so as to be spaced apart in the longitudinal direction A. Because the slot geometry 6 is thus configured in two layers, this creates the further shell portion 5.2 which forms an intermediate ring between the main part 4 and the locking ring 5. It is understood that the shell portion 5.2 and thus the intermediate ring is dispensed with in the case of a single-layer slot geometry 6, i.e. should only the slot 6.1 be present. The slot geometry 6 is produced by means of an apparatus according to the invention and at least partially acts as a predetermined breaking point for entirely or partially separating the main part 4 from the locking ring 5 when the main part 4 is initially removed from the bottleneck.

FIG. 1*a* in a superimposed manner shows the developed slot geometry 6 in order for the profile thereof to be better visualized. FIG. 1*b* shows the slot geometry 6 as the latter is configured on the closure cap 1.

The slot 6.1 delimits the main part 4 in the longitudinal direction A and, with the exception of a wide interruption 6.1*a*, is largely configured so as to be completely encircling. The wide interruption 6.1*a* forms a connection point between the intermediate ring, formed by the shell portion 3.2, and the main part 4, said connection point not being provided for separation when the main part 4 is removed. The further profile of the slot 6.1 has a plurality of narrow interruptions 6.1*b* which provide holding bridges or supporting bridges, respectively, between the main part 4 and the intermediate ring formed by the shell portion 3.2. The holding bridges or supporting bridges, respectively, form predetermined breaking points which are provided for separation, i.e. are broken, when the main part 4 is initially removed from the bottleneck. The slot 6.1 at the ends directed toward the interruption 6.1*a* is angled toward the end side 2, i.e. has end portions 6.1*c* which have an angle of less than 90° in relation to the direction A.

The slot 6.2 only partially encircles the shell 3 and has a wide interruption 6.2*a* which in FIG. 1*a* is disposed on that side of the closure cap 1 that faces away, i.e. in terms of the longitudinal axis A is opposite the interruption 6.1*a* (indicated behind the shell portion 3.3*a* in FIG. 1*c*). The wide interruption 6.2*a* forms a connection point between the intermediate ring, formed by the shell portion 3.2, and the locking ring 5, said connection point not being provided for separation when the main part 4 is removed. The further profile of the slot 6.2 has a plurality of narrow interruptions 6.2*b* which provide holding bridges or supporting bridges, respectively, that act as predetermined breaking points between the intermediate ring, formed by the shell portion 3.2, and the locking ring 5. The slot 6.2 in the region of the interruption 6.1*a* of the first slot 6.1 has a convexity 6.2*c* which is directed away from the main part 4 and is composed of a portion that is offset so as to be parallel in relation to the primary profile of the slot 6.2 in the direction of A, as well as two connection portions which are inclined in relation to A. With the exception of the interruptions 6.2*b*, the slot 6.2 including the convexity 6.2*c* is configured so as to be contiguous.

After an initial removal of the main part 4, i.e. when the holding bridges or supporting bridges 6.1*b* and 6.2*b* have been separated or broken, respectively, the main part 4 via the intermediate ring formed by the shell portion 3.2 thus remains connected to the locking ring 5 by way of the connection points formed by the wide interruption 6.1*a* of the slot 6.1 and the wide interruption 6.2*a* of the slot 6.2. The main part 4, the intermediate ring and the locking ring 5 after the initial removal can thus be mutually pulled apart in a zigzag fashion, wherein the connection points formed by the wide interruptions 6.1*a* and 6.2*a* serve as an articulated connection between the parts. This makes possible a main part 4 of the closure cap 1 which is easy to remove and replace and by way of the intermediate ring remains captively connected to the locking ring 5 anchored to the bottleneck. It is moreover ensured that an initial opening of the container, i.e. an initial removal of the main part 4, can be directly identified by a consumer.

Figure 2A:
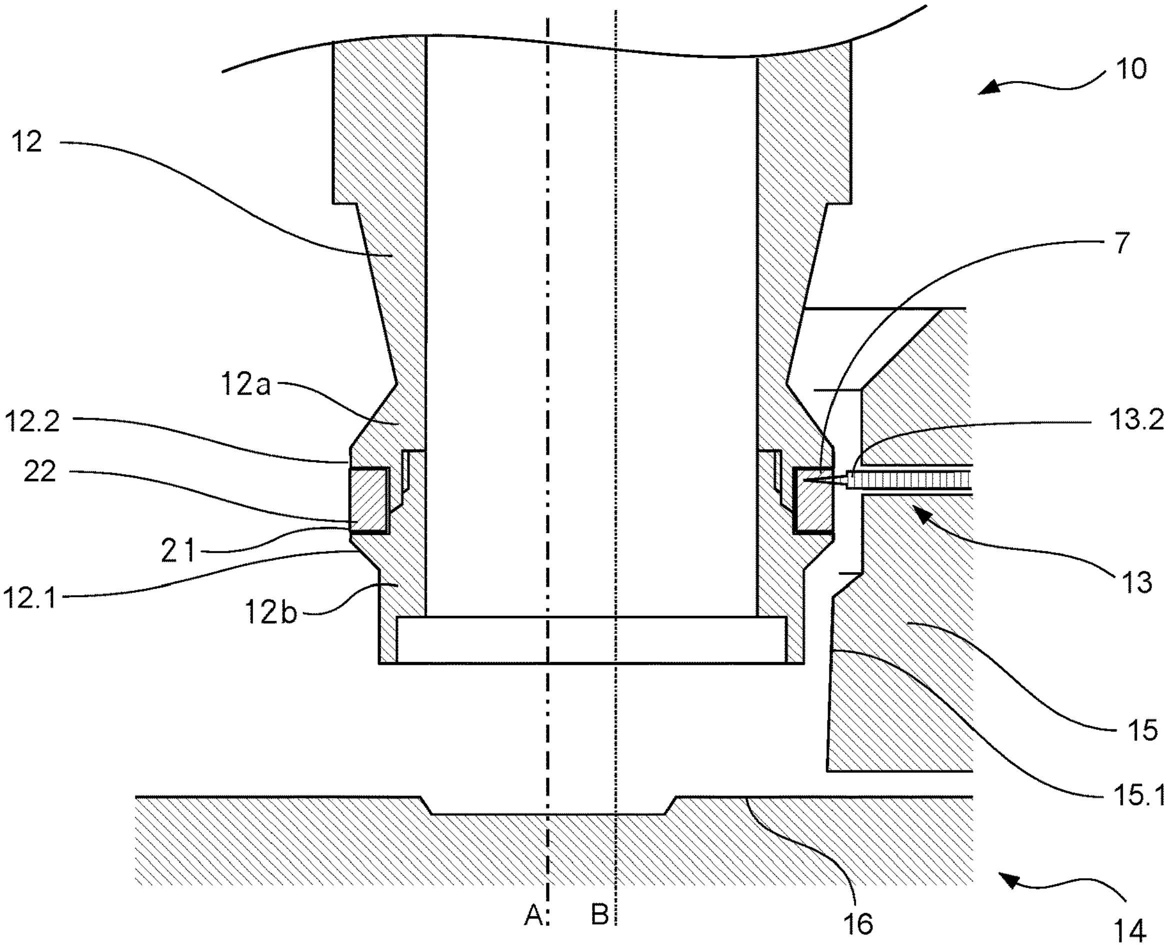
FIG. 2*a* depicts a cross-sectional view through a first embodiment of a support mandrel of an apparatus according to the invention, for the machining of closure cap blanks with a non-folded shell, during preconditioning.

FIG. 2*a* shows a cross-sectional view through a first embodiment of a support mandrel 12 of an apparatus 10 according to the invention, for the machining of closure cap blanks with a non-folded shell, during preconditioning. FIG. 2*a* shows the support mandrel 12 in the region of a cutting section S (cf. FIG. 6) of the apparatus 10, the support mandrel 12 being transported along a transport path past a stationary cutting knife 13.

The support mandrel 12 is disposed on a rotary table 14 of the apparatus 10 so as to be rotatable about a rotation axis B. The rotary table 14 features a support surface 16 for supporting closure cap blanks at their end side (see below, FIG. 3*a*).

On its shell, the support mandrel 12 features a support region 12.1 having a circular-cylindrical portion 12.2. The circular-cylindrical portion is provided by two parts 12*a*, 12*b* of the support mandrel 12 that are connected to each other with a screw connection. A groove 21 is formed between the two parts 12*a*, 12*b*, and a rotationally symmetric ring 22 made from PEEK is accommodated in the groove 21. The ring 22 is clamped between the two parts 12*a*, 12*b* of the support mandrel 12 and secured against relative rotation with respect to the support mandrel 12. The thickness of the ring 22 (measured in a radial direction) is about 1 mm-3 mm.

The stationary cutting knife 13 is disposed on a holding structure 15 of the apparatus 10 which is stationary in relation to the rotary table 14. The holding structure 15 features a contact face 15.1 facing the support mandrel 12. In the displayed section, the cutting knife 13 features a single cutting blade 13.2. The cutting knife 13 features a fixture, in which the cutting blade 13.2 may be clamped in different radial positions. In the position shown in FIG. 2*a*, the cutting blade 13.2 is in an extended position, i.e. moved in a radial direction, towards the support mandrel 12 with respect to a (non-extended) standard position. In the extended position, the tip portion of the cutting blade 13.2 extends into the ring 22 when the support mandrel 12 is positioned in the cutting section S.

During the preconditioning step, when the cutting blade 13.2 is in its extended position, a groove geometry 7, as defined by the geometry of the cutting knife 13, is created in the ring 22, when the mandrel is rotated in a synchronized way with respect to the cutting knife 13 (see below, FIGS. 6-8). The groove geometry generated is described in more detail below, in connection with FIG. 5*a*, 5*b*.

Figure 2B:
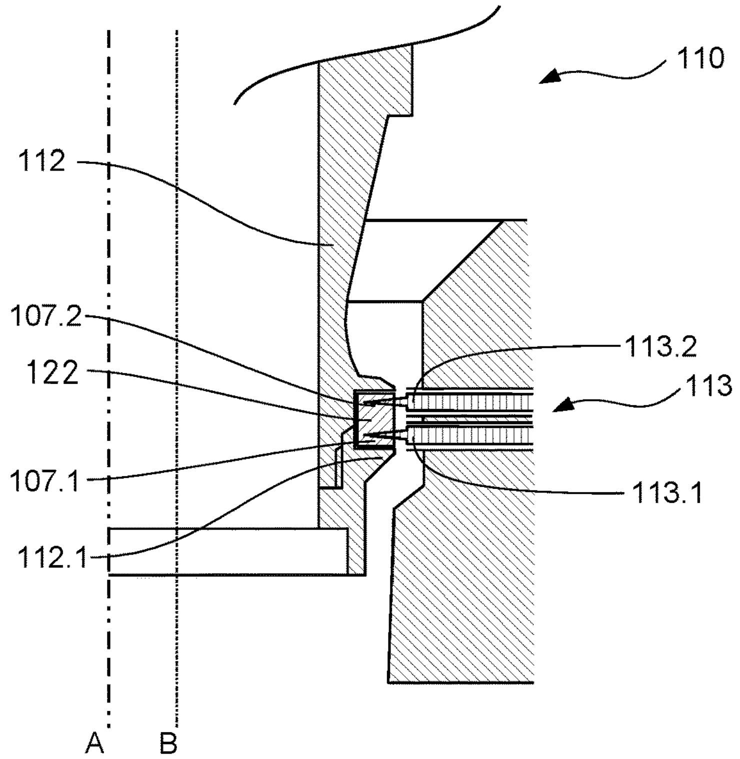
FIG. 2*b* depicts a fragment of a cross-sectional view through a second embodiment of a support mandrel of an apparatus according to the invention, for the machining of closure cap blanks with a folded shell, during preconditioning.

FIG. 2*b* shows a fragment of a cross-sectional view through a second embodiment of a support mandrel 112 of an apparatus according to the invention, for the machining of closure cap blanks with a folded shell, during preconditioning. The apparatus substantially corresponds to the apparatus according to the first embodiment. As opposed to the apparatus 10, the apparatus 110 is however provided for cutting a closure cap blank 101A which has a sub-portion 103.3*a* of a shell portion 103.3 of a shell 103 that has already been folded inward prior to the cutting procedure (see FIG. 3*b*). For that purpose, the support region 112.1 of the support mandrel 112 of the apparatus 110 here is configured in such a manner that there is room for receiving the already folded sub-portion 103.3*a* (see FIG. 3*b*).

Furthermore, the apparatus 110 in the illustration of FIG. 2*b* is situated in the region of the cutting section S in which, in the momentary cutting region, portions of both cutting blades 113.1 and 113.2 in their extended positions protrude simultaneously into the ring 122 in order to create the groove geometry 107 during the preconditoning step, including two grooves 107.1, 107.2.

Figure 3A:
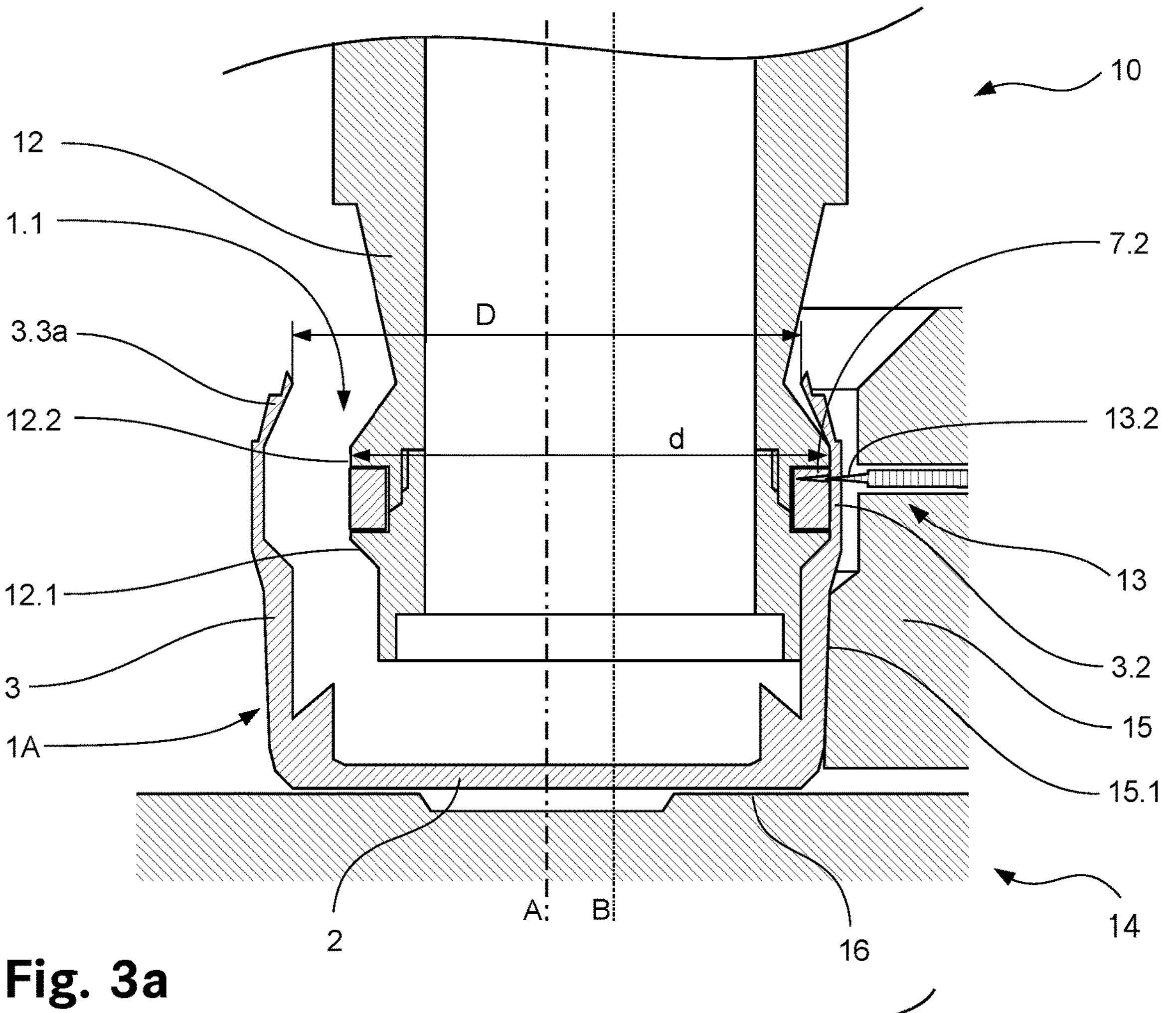
FIG. 3*a* depicts the cross-sectional view through the first embodiment during the cutting process.

FIG. 3*a* shows a cross-sectional view through the first embodiment during the cutting process. The closure cap 1 is produced by introducing the slot geometry 6 with slots 6.1 and 6.2 into a closure cap blank 1A, using the apparatus 10. To this end, the support region 12.1 of the support mandrel 12 engages in the interior 1.1 of the closure cap blank 1A. A largest radial diameter d of the support mandrel 12 in the support region 12.1 is smaller than the largest radial diameter D of an axial end-side opening of the closure cap blank 1A. The end-side opening presently is determined by the non-folded sub-portion 3.3*a* of the shell portion. It is ensured in this way that the support mandrel 12 in a loading region of the apparatus 10 (not shown) in which the closure cap blank 1A is acquired by the transport installation 11 can be easily introduced into the interior 1.1. Likewise, the support mandrel 12 can again be easily moved out of the interior 1.1 for removing the completed closure cap 1 in a removal region (not shown). The rotation axis B of the support mandrel 12 and the primary axis A of the closure cap blank 1A are mutually offset, i.e. not disposed so as to be coaxial, by virtue of the smaller diameter d.

By way of the circular-cylindrical portion 12.2 of the support region 12.1 the support mandrel 12 in a momentary cutting region disposed at the cutting knife 13 bears directly on an internal side of the shell 3, in particular in the shell portion 3.2, of the closure cap blank 1A. The rotary table 14 ensures an advancing movement along the transport path T, while a rotation of the support mandrel 12 or of the support region 12.1, respectively, about the rotation axis B facilitates a superimposed rotation of the closure cap blank 1A. The support portion 12.1 rolls on the internal side of the shell 3 when the support mandrel 12 rotates about the rotation axis B. The momentary transport path T at least in the region of the cutting section S is aligned so as to be substantially perpendicular to the rotation axis B and in the illustration of FIG. 3*a* is perpendicular to the drawing plane. The longitudinal axis A of the closure cap blank 1A is disposed so as to be parallel to the rotation axis B of the support mandrel 12. The support surface 16 supports the closure cap blank 1A at the end side 2. The locking ring 5 of the closure cap blank 1A is not folded during the cutting procedure, i.e. the sub-portion 3.3*a* of the shell portion 3.3 has not been folded into the interior 1.1 of the closure cap blank 1A and from the end side 2 extends so as to point in the direction of A.

For the cutting operation, the cutting blade 13.2 is clamped in the fixture of the cutting knife in its standard (non-extended) radial position. In the region of the shell 3, the cutting blade 13.2 protrudes into the transport path of the closure cap blank 1A. The contact face 15.1 of the holding structure 15 serves for supporting the closure cap blank 1A on an external side of the shell portion 3.1, said supporting being directed laterally, i.e. perpendicularly to the rotation direction B.

The groove geometry 7, i.e. the grooved portion 7.1 in the support region 12.1 on the circular-cylindrical portion 12.2, generated during the preconditioning, is configured and disposed in such a manner that the portions of a cutting edge of the cutting blade 13.2 that is disposed in the momentary cutting region protrudes into a grooved portion 7.1. The cutting blade 13.2 penetrates the shell 3, in particular in the shell region 3.2, and generates a local portion of the slot 6.1 of the slot geometry 6 of the closure cap 1. However, due to the grooves created during the preconditioning there is no direct interaction between the cutting blade 13.2 and the ring 22. Due to the fact that the cutting blade 13.2 has a tapered end and that the cutting blade was in an extended position when creating the groove geometry 7, the axial extension of the grooved portion 7.1 is larger than the thickness of the non-extended cutting blade 13.2 in the corresponding radial location. Therefore, there is a certain free space in all directions between the cutting blade 13.2 and the walls of the grooved portion 7.1. (The same applies to the other cutting blade 13.1, which is not visible in the FIGS. 2*a*, 3*a*).

Figure 3B:
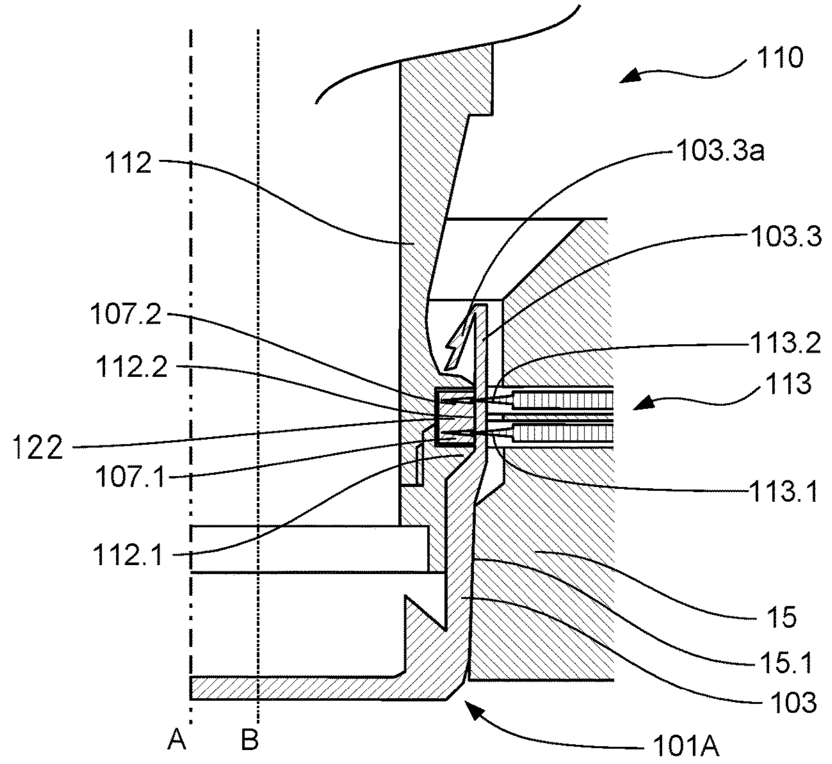
FIG. 3*b* depicts a fragment of a cross-sectional view through the second embodiment during the cutting process.

FIG. 3*b* shows a fragment of a cross-sectional view through the second embodiment during the cutting process. Again, the situation is similar to that shown in FIG. 3*a*. In contrast to the situation depicted there, the sub-portion 103.3*a* of the shell portion 103.3 of the shell 103 of the closure cup blank 101A has already been folded inward prior to the cutting process. It is accommodated by a respective recess in the shell of the support mandrel 112. As mentioned above, in the region of the cutting section S shown in FIG. 3*b*, both cutting blades 113.1, 113.2 are present. They are positioned in their standard position and protrude into the transport path of the closure cap blank 101A. They penetrate the shell 103 and their tips slightly enter the groove geometry 107, i.e. the grooved portions 107.1, 107.2 in the support region 112.1 of the support mandrel 112, generated during the preconditioning. Again there is no direct interaction between the cutting blades 113.1, 113.2 and the ring 122.

Figure 4:
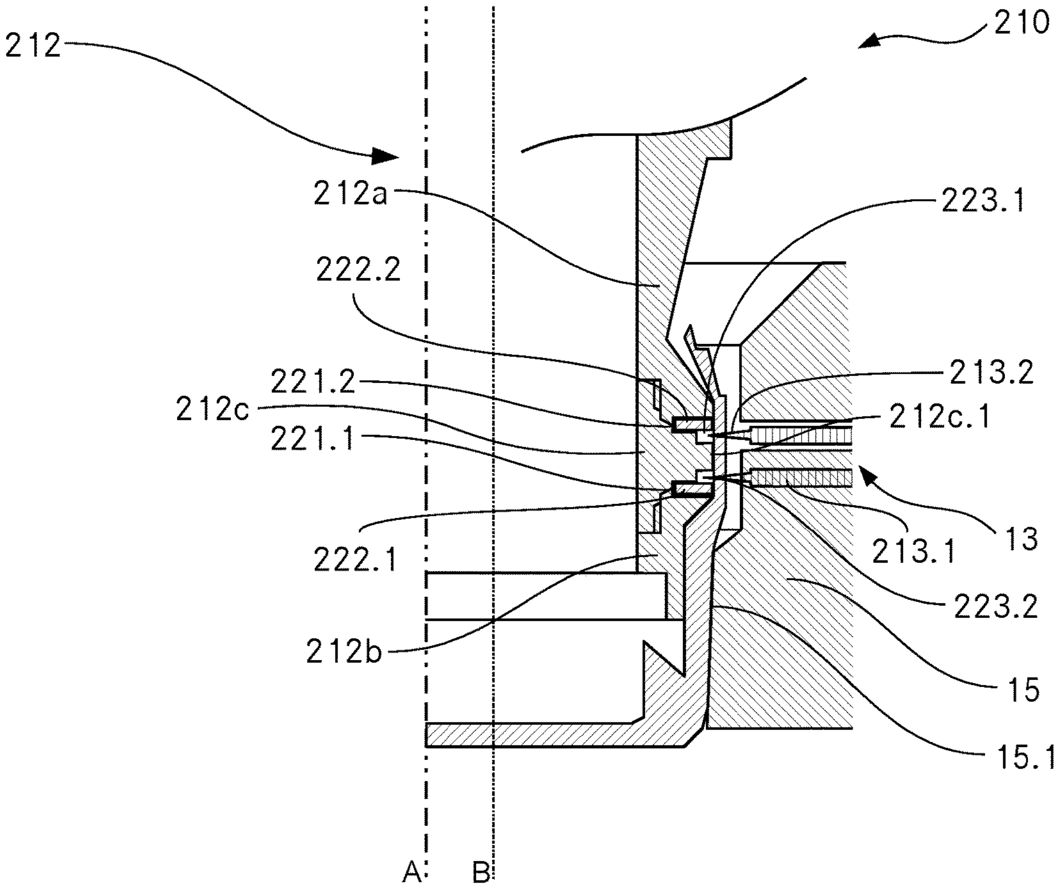
FIG. 4 depicts a fragment of a cross-sectional view through a third embodiment of a support mandrel of an apparatus according to the invention, during the cutting process.

FIG. 4 shows a fragment of a cross-sectional view through a third embodiment of a support mandrel of an apparatus according to the invention, during the cutting process. The apparatus is similar to those according to the first and second embodiments described above. However, instead of a single ring made from PEEK, two rings 222.1, 222.2 are accommodated in respective grooves 221.1, 221.2 arranged between an upper part 212*a*, a middle part 212*c* and a lower part 212*b* of the support mandrel 212. The three parts 212*a* . . . *c* are connected to each other by screw connections. Again, the rings 222.1, 222.2 are clamped between the neighboring parts and secured against relative rotation to the mandrel 212. Again, the rings have a thickness (measured in a radial direction) of about 1 mm-2 mm. In the middle part 212*c*, further grooves 223.1, 223.2 are arranged neighboring the grooves 221.1, 221.2. The further grooves 223.1, 223.2 have a smaller depth than the grooves 221.1, 221.2 accommodating the rings 222.1, 222.2, their width (in axial direction) is comparable. In between the further grooves 223.1, 223.2, a wall portion 212*c*.1 is formed in the middle part 212*c* that extends coplanar with the cylindrical wall portions in the upper part 212*a* and the lower part 212*b* and with the outer surface of the rings 222.1, 222.2.

In the horizontal sections of the slot geometry, the tips of the blades 13.1, 13.2 are accommodated in the further grooves 223.1, 223.2. During preconditioning, a groove geometry is only created in non-horizontal sections. In those sections, grooves will be formed in the rings 222.1, 222.2, and the tips of the blades 13.1, 13.2 will be accommodated in these grooves during the actual cutting of the closures.

Figure 5A:
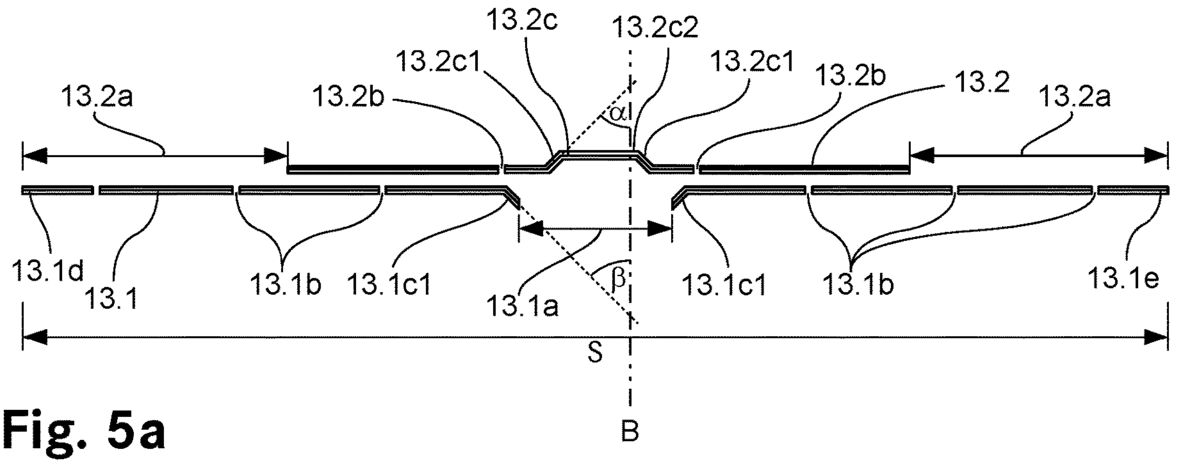
FIG. 5*a* depicts a view of a cutting knife having two cutting blades.
Figure 5B:
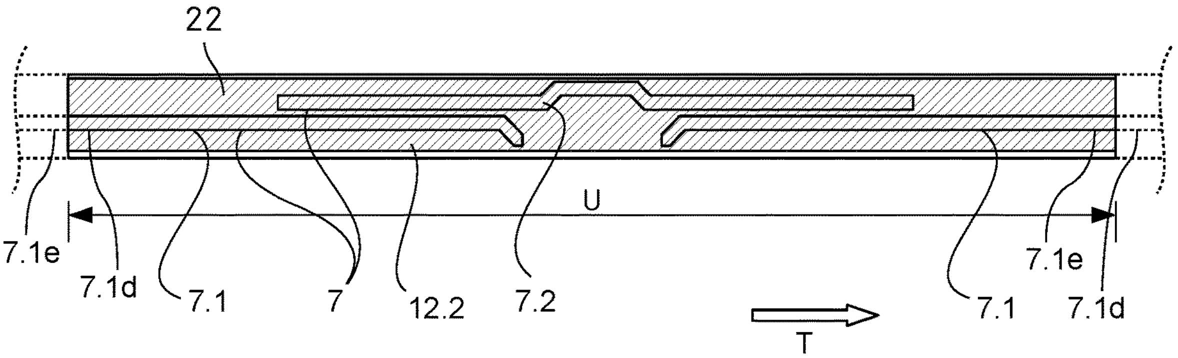
FIG. 5*b* depicts the groove geometry of the support mandrel according to the first or second embodiment, after preconditioning.
Figure 5C:
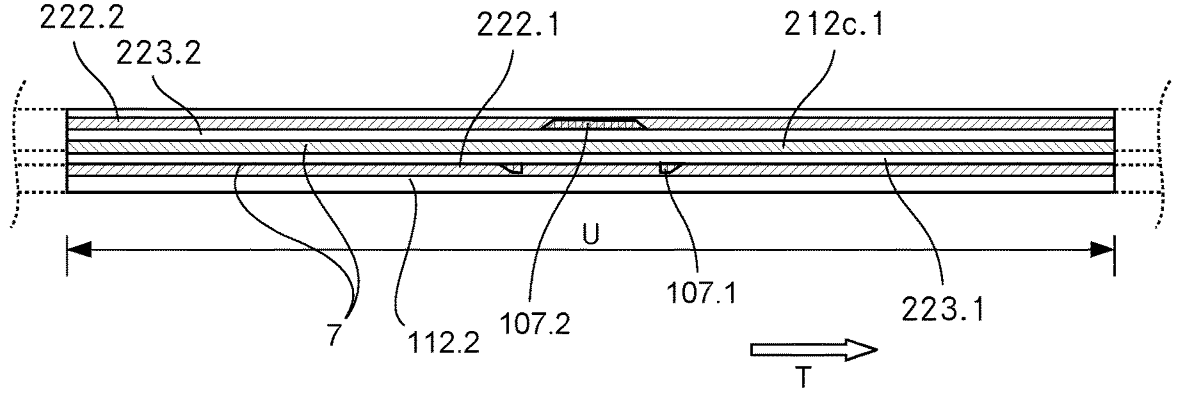
FIG. 5*c* depicts the groove geometry of the support mandrel according to the third embodiment, after preconditioning.

FIG. 5*a* shows a schematic view of the cutting knife 13 having two cutting blades 13.1 and 13.2. FIG. 5*b* shows an illustration of the corresponding groove geometry 7 of the support mandrel according to the first or second embodiment, after preconditioning. FIG. 5*c* shows an illustration of the corresponding groove geometry 7 of the support mandrel according to the third embodiment, after preconditioning.

A height profile of the cutting blades 13.1 and 13.2 here corresponds to the superimposed illustration of the slots 6.1 and 6.2 of FIG. 1*a*. The cutting blades 13.1 and 13.2 by way of their primary direction are aligned in the direction of the transport path T and by way of the overall length thereof define the cutting section S. The primary direction of the cutting blades 13.1 and 13.2 is aligned so as to be perpendicular to the rotation axis B of the support mandrel 12. The cutting blades 13.1 and 13.2 are disposed on top of one another in the direction of B and partially overlap in a projection along the rotation axis B.

The lower cutting blade 13.1 comprises two portions which are separated by a wide interruption 13.1*a*. Each of these portions has a plurality of narrow interruptions 13.1*b*. Portions 13.1*c*1 which are angled at the end side and which are inclined in relation to the direction B, i.e. have an angle $\beta<90°$, are configured toward the wide interruption 13.1*a*. The length of the cutting blade 13.1 in the primary direction thereof along the transport path T is sized in such a manner that said length corresponds at least to the length of an external circumference of the shell 3 of the closure cap blank 1A. The slot 6.1 is generated by the cutting blade 13.1, wherein the slotted regions generated by the end regions 13.1*d* and 13.1*e* are mutually adjacent, or slightly overlap, respectively, after a complete revolution of the closure cap blank 1A. The cut 6.1 generated by the cutting blade 13.1 is thus configured so as to be continuous on the external ends that face away from the wide interruption 6.1$a$. The wide interruption 13.1$a$ of the cutting blade 13.1 generates the interruption 6.1$a$ of the slot 6.1, while the narrow interruptions 13.1$b$ generate the narrow interruptions 6.1$b$.

The cutting blade 13.2 in the transport direction T is disposed so as to be centric above the cutting blade 13.1. The cutting blade 13.2 in the region of the wide interruption 13.1$a$ has a convexity 13.2$c$ in the direction of the rotation axis B. The convexity 13.2$c$ is assembled from three cutting edge portions 13.2$c$1 and 13.2$c$2. The cutting edge portions 13.2$c$1 are inclined in relation to the direction B, i.e. have an angle $\alpha<90°$. The cutting edge portion 13.2$c$2 which runs perpendicularly to the direction B is disposed between the inclined cutting edge portions 13.2$c$1. The convexity 13.2$c$ generates the convexity 6.2$a$ of the slot 6.2. The cutting blade 13.2 outside the convexity 13.2$c$ has a plurality of narrow interruptions 13.2$b$ which generate the interruptions 6.2$b$ in the slot 6.2.

The cutting blade 13.2 overall is configured so as to be shorter than the cutting blade 13.1 and thus covers only part of the external circumference of the closure cap blank 1A. The wide interruption 6.2$a$ of the slot 6.2 thus results by virtue of the portions 13.2$a$ along S that are free of cutting edges.

FIG. 5$b$ shows the corresponding grooved portions 7.1 and 7.2 of the support mandrel 12 according to the first embodiment, generated in the support region 12.1, in particular in the circular-cylindrical shell portion 12.2, during the preconditioning step (the situation in the second embodiment is identical). The entire slot geometry as defined by the cutting blades is reproduced in the ring 22. The view of FIG. 5$b$ here shows the circular-cylindrical shell portion 12.2 rolling on an imaginary plane. A length of a circumference U of the circular-cylindrical shell portion 12.2 is shorter than the cutting section S. The cutting section S presently corresponds substantially to a length of an external circumference of the shell 3 of the closure cap blank 1A. In the course of a complete revolution of the closure cap blank 1A, the support mandrel 12 thus performs more than one revolution about the rotation axis B of the latter. In the course of a complete revolution of the support mandrel 12, the cutting blade 13.1 is thus only partially covered by the grooved portion 7.1. In the course of a previous or a subsequent revolution of the support mandrel 12, the end regions 13.1$d$ and 13.1$e$ of the cutting blade 13.1 that are aligned so as to be perpendicular to the rotation direction B are therefore covered by end regions 7.1$e$ and 7.1$d$, respectively, of the grooved portions 7.1 that are likewise aligned so as to be perpendicular to the rotation direction B.

FIG. 5$c$ shows the corresponding grooved portions 107.1, 107.2 of the support mandrel 112 according to the third embodiment. Only the non-horizontal portions of the cutting geometry as defined by the cutting blades are reproduced in the rings 222.1, 222.2. For the horizontal portions, the grooves 223.1, 223.2 are foreseen. A middle portion of the shell of the closure cap blank, where no cuts are required, is supported by the rigid wall portion 212$c$. 1 of the middle part 212$c$ of the support mandrel arranged between the grooves 223.1, 223.2.

In the actual cutting process, the preconditioned support mandrel 12 of the transport installation 10 is moved in a translatory manner along a transport direction T (advancing movement V). At the same time, the support mandrel 12 by way of the support region 12.1 rotates about the rotation axis B thereof in such a manner that the groove geometry 7 including grooved portions 7.1 and 7.2, which has been produced in the preconditioning step in the circular-cylindrical shell face 12.2 of the support region 12.1 rolls so as to be congruent on the cutting blades 13.1 and 13.2 of the cutting knife 13. The groove geometry 7 here has a profile which covers the cutting edge profile on the circumference of the support region 12.1 in the course of more than one revolution of the support mandrel 12. The cutting blades 13.1 and 13.2 in the momentary cutting region here engage in the grooved portions 7.1 and 7.2, respectively.

The contact face 15.1 may have a toothing which interacts with the longitudinal fluting of the external side of the shell portion 3.1 in such a manner that the closure cap blank 1A in an advancing movement of the support mandrel 12 is conjointly rotated along the transport direction. The toothing of the contact face 15.1 thus acts as an internal toothing in which the longitudinal fluting engages in the manner of a gearwheel. A spacing of the support mandrel 12 from the contact face 15.1 as well as from the cutting blades 13.1 and 13.2 is sized in such a manner that the closure cap blank 1A can be disposed or seized between the support region 12.1 and the contact face 15.1 as well as the cutting blades 13.1 and 13.2. The transport path T is curved, preferably in a circular manner, at least in the region of the cutting section S. The cutting knife 13, i.e. in particular the cutting blades 13.1 and 13.2, are correspondingly curved and follow the profile of the transport path T.

The cutting knife 13 can be of modular construction and have in particular an easily replaceable cutting edge module 13.3 in which the inclined portions 13.1$c$1 and 13.2$c$1 are disposed. Because these portions according to experience are subjected to greater wear, it is advantageous for at least this region to be designed so as to be separately replaceable.

Figure 6:
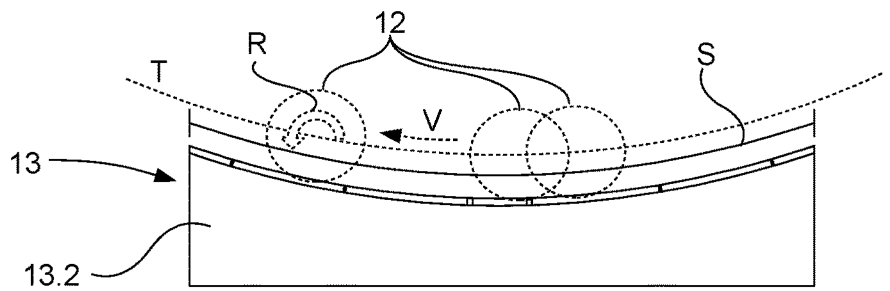
FIG. 6 depicts a plan view along a rotation axis of a support mandrel looking onto a curved transport path of circular shape in a cutting section along a curved cutting knife.

FIG. 6 schematically shows a plan view along the rotation axis B of the support mandrel 12 on the transport path T along a path curved in a circular manner. The cutting knife 13, or the cutting blades 13.1 and 13.2 thereof, respectively, are curved so as to correspond to the transport path T such that the support mandrel 12 on the movement path thereof during the advancing movement V of the transport installation 10 is moved along the latter at a constant spacing from the cutting knife 13. At the same time, the support mandrel 12 rotates in a rotating movement R about the rotation axis B thereof. The transport path T in the region of the cutting knife 13 defines the cutting section S.

Figure 7:
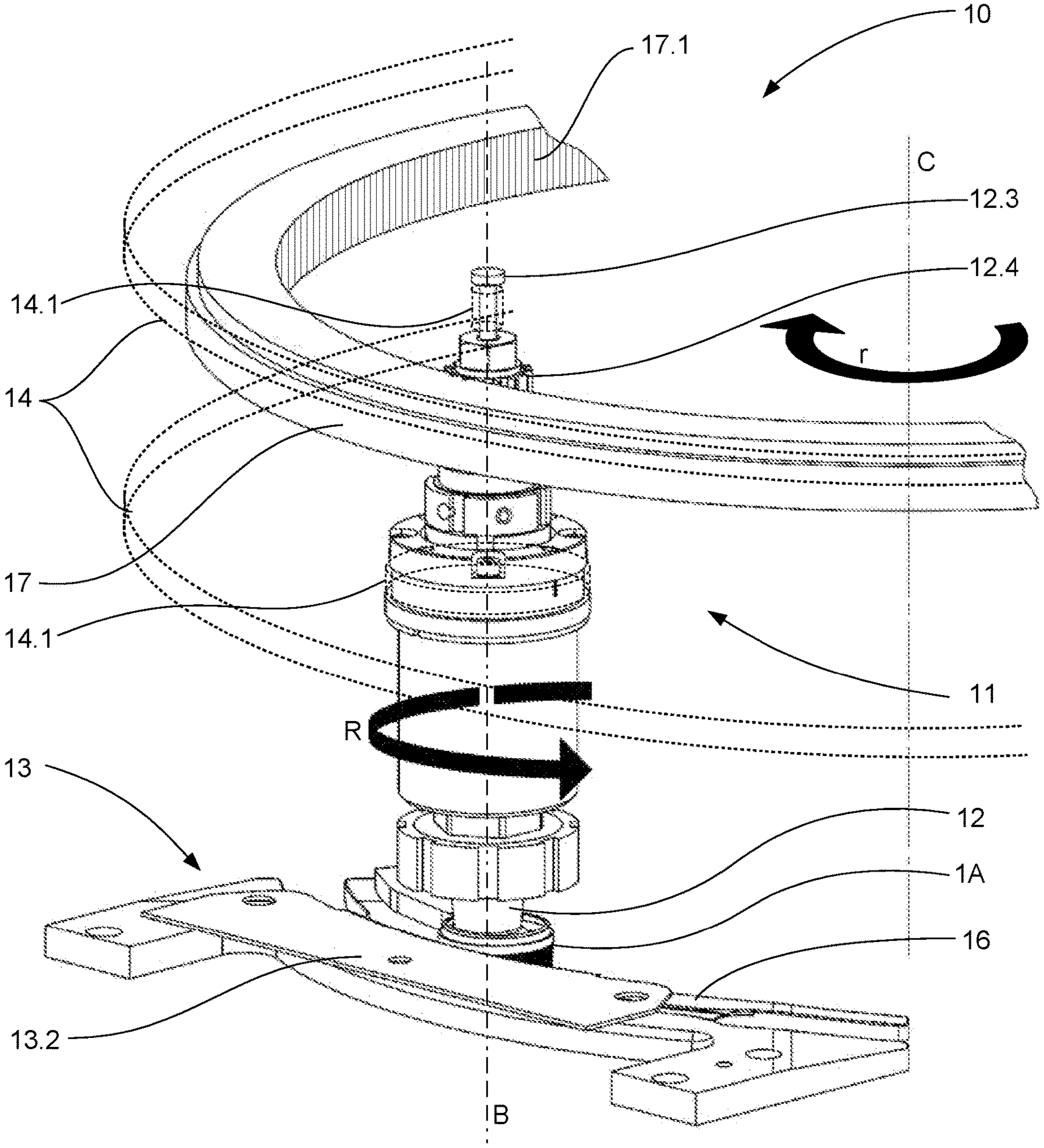
FIG. 7 depicts an apparatus according to the invention, having a transport installation comprising a rotary table and a stationary synchronizing ring.

FIG. 7 shows a schematic view of the apparatus 10 according to the invention having the transport installation 11 which comprises the rotary table 14 and the support mandrel 12. In the embodiment of FIG. 7, the support mandrel 12 is mounted on the rotary table 14 (illustrated by dashed lines). The rotary table 14 here is only schematically indicated and can comprise one or a plurality of support structures on which the support mandrel 12 is mounted on one or a plurality of counter-bearings 14.1 so as to be rotatable about the rotation axis B in relation to the rotary table 14. The support mandrel 12 can however also have a housing, for example, in which the rotatable mounting is configured and which is fixedly anchored to the rotary table 14.

The rotary table 14 is mounted on a stationary holding structure (not shown) of the apparatus 10 so as to be rotatable about a rotation axis C. A rotating movement r of the rotary table 14 about the rotation axis C defines the advancing movement V of the support mandrel 12 of the transport installation 11 along the transport path T. In the embodiment of the apparatus 10 having the rotary table 14, the transport path T is thus circular. It is understood that a plurality of support mandrels 12 can be disposed along the circumference so as to be rotatably mounted on the rotary table 14, said support mandrels 12 being simultaneously moved along the transport path T and successively passing the cutting section S.

A gearwheel 12.4 is fixedly disposed so as to be coaxial with the rotation axis B on an axle member 12.3 of the support mandrel 12, said axle member 12.3 being disposed so as to be coaxial with the rotation axis B. The gearwheel 12.4 rolls on an internal toothing 17.1 of a ring 17 which is stationary in relation to the rotary table 14. In this way, it can be achieved that the rotating movement R of the support mandrel 12 is synchronized with the advancing movement V defined by the rotating movement of the rotary table 14. The rotating movements R and r here have opposite directions of rotation. In a suitable configuration of the toothing, the synchronization can be chosen in such a manner that the shell face 12.2 of the support mandrel 12, comprising the groove geometry 7, is rolled exactly on the cutting knife 13 such that the cutting edges of the cutting blades 13.1 and 13.2 in the momentary cutting region can in each case be disposed in the grooved portions 7.1 and 7.2. The gearwheel 12.4, conjointly with the ring 17, thus form parts of a synchronizing installation of the apparatus 10 that is easy to configure. In the case of a plurality of support mandrels 12, the gearwheels 12.4 of all support mandrels 12 can roll on the same ring 17 such that the latter couples the rotating movements R of the support mandrels 12 about the respective rotation axes B.

Figure 8:
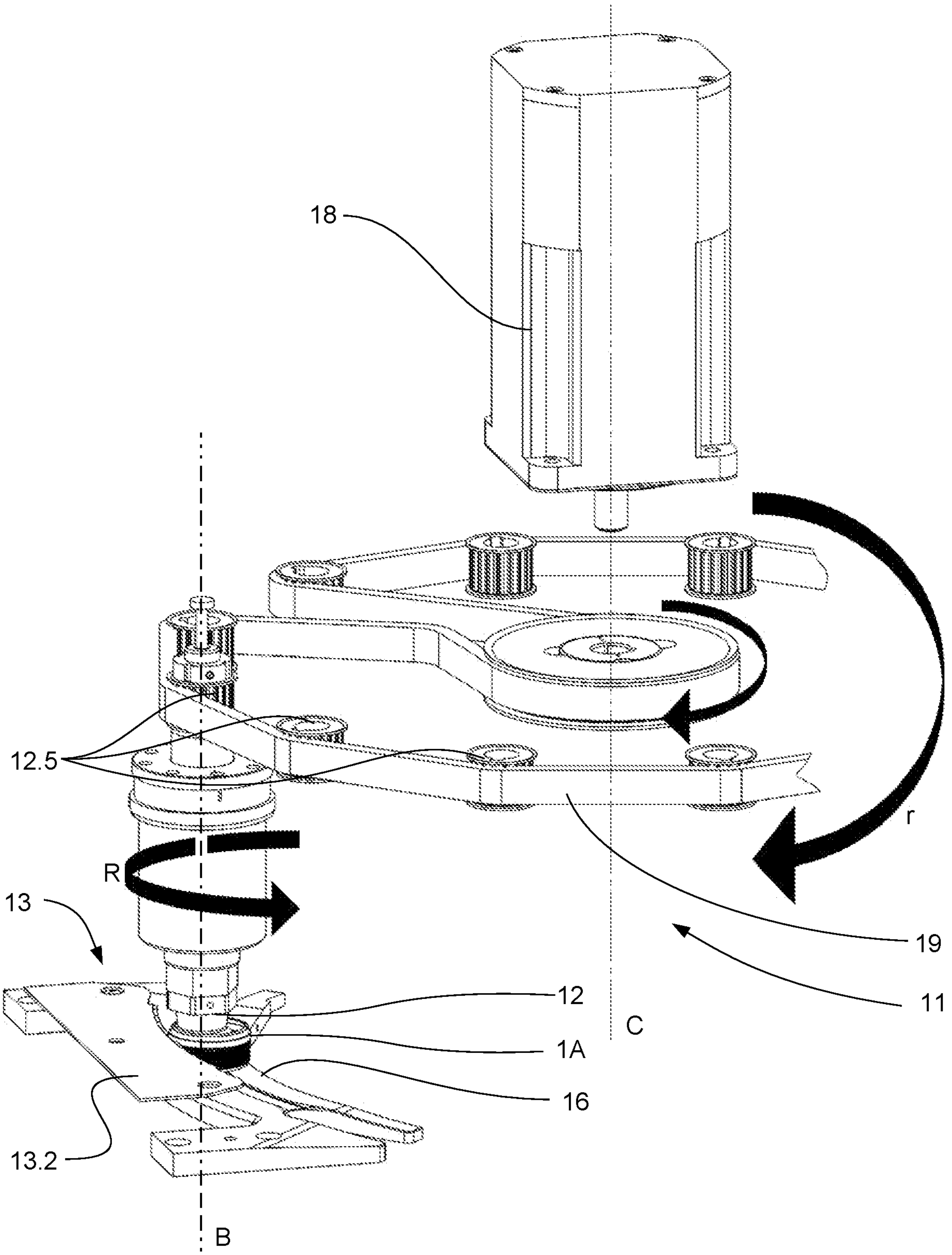
FIG. 8 depicts an apparatus according to the invention, having a transport installation comprising a rotary table and having a separately driven synchronizing belt.

FIG. 8 shows an alternative embodiment of the apparatus 10 in which synchronizing of the rotating movements R and r of the support mandrel 12 or of the rotary table 14 (not illustrated in FIG. 8), respectively, is achieved by way of a separate drive 18. The drive 18 drives a timing belt 19 which runs across sprockets 12.5 of a plurality of support mandrels 12 that are mounted on the rotary table 14 so as to be rotatable about local rotation axes B. The timing belt 19, in a direction opposed to the rotating direction of the rotating movement r of the rotary table 14, runs externally across the sprockets 12.5 such that the support mandrels 12 rotate in an opposite direction of rotation to r about the respective rotation axis B. The timing belt 19 thus couples the rotating movement of all support mandrels 12 about the respective rotation axis B thereof and rotates conjointly with the rotary table 14. Independent synchronizing of the rotating movements R of the support mandrels 12 with the advancing movement V of the transport installation 11 can be achieved by controlling the drive 18.

Summarizing, it is to be observed that the invention allows for a reliable and cost-effective production of closure caps having a locking ring. The scope of protection of the present invention is given by the claims and is not limited by the features illustrated in the description or shown in the figures.

What is claimed is:

1. An apparatus for producing a locking ring on a closure cap for a container, comprising:

a stationary fixture configured to accommodate at least one cutting knife and comprising a cutting blade extending extends along a cutting section;

a transport installation configured to transport a support mandrel along the cutting section, wherein the support mandrel is configured to support at least one of a shell of a closure cap blank and a shell internal side such that the shell, during a cutting procedure, rolls on the cutting blade, and wherein the support mandrel comprises a rotatable mounting configured to mount the support mandrel such that the mandrel rotates about a rotation axis oriented perpendicularly to the cutting section; and wherein, the stationary fixture is configured to accommodate at least one cutting knife in a first configuration wherein the cutting blade comprises a first radial position relative to a path of the support mandrel and in a second configuration wherein the cutting blade comprises a second radial position relative to the path of the support mandrel, and wherein a radial distance of the cutting blade from a path of the support mandrel is larger in the second position than in the first position;

the support mandrel includes at least one section running around a circumferential surface of the support mandrel in an angular range, wherein the section is made of a cuttable material;

in the first configuration, the cutting blade of the at least one cutting knife is configured and arranged to engage with the cuttable material of the at least one section of the support mandrel so as to create a lasting groove in the cuttable material, the lasting groove having an axial extension;

in the second configuration, the cutting blade of the at least one cutting knife is configured and arranged to engage with the shell of the closure cap blank to generate a slot geometry in the shell of the closure cap and to be received within the lasting groove, wherein a thickness of the cutting blade in the second configuration is smaller than the axial extension such that free space is defined in all directions between the cutting blade and walls of the lasting groove in the cuttable material; and the apparatus further comprises a synchronizing installation by which an advancing movement of the transport installation along the cutting section is able to be synchronized with a rotating movement of the support mandrel about the rotation axis.

2. The apparatus according to claim 1, wherein the stationary fixture is further configured to accommodate the cutting knife in different radial positions relative to the path of the support mandrel.

3. The apparatus according to claim 1, wherein the stationary fixture further comprises an adjustment mechanism for adjusting a radial position of the fixture relative to the path of the support mandrel.

4. The apparatus according to claim 1, wherein a radial distance of the cutting blade in the second configuration from the cutting blade in the first configuration is 0.1-0.5 mm.

5. The apparatus according to claim 1, wherein a cross-sectional geometry of a cutting edge of the cutting blade is tapered.

6. The apparatus according to claim 1, wherein the cuttable material is a polymer.

7. The apparatus according to claim 6, wherein the cuttable material is polyether ether ketone.

8. The apparatus according to claim 1, wherein at least one section made of the cuttable material comprises a single ring arranged circumferentially on the support mandrel.

9. The apparatus according to claim 8, wherein at least one circumferential groove is arranged adjacent to the ring.

10. The apparatus according to claim 8, wherein two circumferential grooves are arranged adjacent to the ring, one on each side of the ring.

11. The apparatus according to claim 1, wherein the slot geometry comprises portions which in relation to the rotation axis of the support mandrel extend at an angle of less than 90°.

12. The apparatus according to claim 1, wherein the cutting knife comprises a plurality of cutting blades arranged in the direction of the rotation axis of the support mandrel at least one of one on top of one another and at least in partial overlap.

13. The apparatus according to claim 1, wherein the slot geometry is defined by at least 1.25 revolutions of the support mandrel about its rotation axis, and wherein a geometry of the groove of the support mandrel corresponds to a superimposition of the slot geometry during the at least 1.25 revolutions.

14. The apparatus according to claim 1, wherein the transport installation is configured as a rotary table, wherein a plurality of support mandrels are disposed along a circumference of the rotary table, and in that the cutting blade of the cutting knife extends along the circumference of the rotary table.

15. An apparatus for producing a locking ring on a closure cap for a container, comprising:

a stationary fixture configured to accommodate at least one cutting knife and comprising a cutting blade extending extends along a cutting section;

a transport installation configured to transport a support mandrel along the cutting section, wherein the support mandrel is configured to support at least one of a shell of a closure cap blank and a shell internal side such that the shell, during a cutting procedure, rolls on the cutting blade, and wherein the support mandrel comprises a rotatable mounting configured to mount the support mandrel such that the mandrel rotates about a rotation axis oriented perpendicularly to the cutting section; and wherein, the stationary fixture is configured to accommodate at least one cutting knife in a first configuration wherein the cutting blade comprises a first radial position relative to a path of the support mandrel and in a second configuration wherein the cutting blade comprises a second radial position relative to the path of the support mandrel, and wherein a radial distance of the cutting blade from a path of the support mandrel is larger in the second position than in the first position;

the support mandrel includes at least one section running around a circumferential surface of the support mandrel in an angular range, wherein the section is made of a cuttable material, wherein at least one section made of the cuttable material comprises a single ring arranged circumferentially on the support mandrel, wherein at least one circumferential empty groove is arranged adjacent to the ring;

in the first configuration, the cutting blade of the at least one cutting knife is configured and arranged to engage with the cuttable material of the at least one section of the support mandrel so as to create a lasting groove in the cuttable material;

in the second configuration, the cutting blade of the at least one cutting knife is configured and arranged to engage with the shell of the closure cap blank to generate a slot geometry in the shell of the closure cap; and the apparatus further comprises a synchronizing installation by means of which an advancing movement of the transport installation along the cutting section is able to be synchronized with a rotating movement of the support mandrel about the rotation axis.

16. The apparatus of claim 15, wherein the circumferential groove is configured such that, in the first configuration, in the horizontal sections of slot geometry, tip of the cutting blade is accommodated by the circumferential groove.

17. The apparatus of claim 16, wherein, in the non-horizontal sections of the slot geometry, tip of the cutting blade creates the lasting groove in the cuttable material.

* * * * *